United States Patent
Komiya

(10) Patent No.: US 11,100,789 B2
(45) Date of Patent: Aug. 24, 2021

(54) CONTROL SYSTEM, INSTALLATION EQUIPMENT, REMOTE CONTROLLER, CONTROL METHOD, AND PROGRAM

(71) Applicant: Mitsubishi Electric Corporation, Tokyo (JP)

(72) Inventor: Noriyuki Komiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/651,742

(22) PCT Filed: Nov. 14, 2017

(86) PCT No.: PCT/JP2017/040882
§ 371 (c)(1),
(2) Date: Mar. 27, 2020

(87) PCT Pub. No.: WO2019/097567
PCT Pub. Date: May 23, 2019

(65) Prior Publication Data
US 2020/0258376 A1  Aug. 13, 2020

(51) Int. Cl.
*G08C 17/02* (2006.01)
*H04B 17/318* (2015.01)
(Continued)

(52) U.S. Cl.
CPC .............. *G08C 17/02* (2013.01); *G06F 8/65* (2013.01); *H04B 17/318* (2015.01); *H04W 4/80* (2018.02)

(58) Field of Classification Search
None
See application file for complete search history.

(56) References Cited

U.S. PATENT DOCUMENTS 9,551,541 B2 * 1/2017 Matsumoto .............. F24F 11/77
10,705,518 B2 * 7/2020 Tung ..................... G05D 1/0016
(Continued)

FOREIGN PATENT DOCUMENTS

JP       H04-080547 A    3/1992
JP       2000-232693 A   8/2000
(Continued)

OTHER PUBLICATIONS

Extended European Search Report dated Oct. 19, 2020 in corresponding EP patent application No. 17931999.1.
(Continued)

*Primary Examiner* — Chico A Foxx
(74) *Attorney, Agent, or Firm* — Posz Law Group, PLC

(57) ABSTRACT

An operation acceptor accepts, from a first user, a first operation with respect to a facility device. An identification information acquirer acquires identification information of the first user. A transmitter transmits the identification information of the first user and identification information of the first operation to the facility device. A storage stores control contents determination information containing identification information of users who use the facility device, facility information of operations with respect to the facility device, control contents with respect to the facility device that are in association with one another. A device controller controls the facility device in accordance with control contents associated with the identification information of the first user and the identification information of the first operation by the control contents determination information.

8 Claims, 10 Drawing Sheets

(51) Int. Cl.
*G06F 8/65* (2018.01)
*H04W 4/80* (2018.01)

(56) References Cited

U.S. PATENT DOCUMENTS

| | | | | |
|---|---|---|---|---|
| 2009/0140057 | A1* | 6/2009 | Leen | F24F 11/30 236/49.3 |
| 2009/0140061 | A1* | 6/2009 | Schultz | G05D 23/1902 236/51 |
| 2014/0088793 | A1* | 3/2014 | Morgan | B60R 16/037 701/2 |
| 2014/0094987 | A1* | 4/2014 | Healey | B60R 25/241 701/1 |
| 2014/0280321 | A1* | 9/2014 | Saib | G06Q 30/0267 707/770 |
| 2015/0204569 | A1* | 7/2015 | Lorenz | F24F 11/62 700/278 |
| 2015/0349972 | A1* | 12/2015 | Deivasigamani | H04L 12/2816 700/275 |
| 2017/0203634 | A1* | 7/2017 | Dickow | G08G 1/0967 |
| 2017/0208423 | A1* | 7/2017 | Dickow | H04L 67/12 |
| 2017/0299210 | A1* | 10/2017 | Nyamjav | H04L 12/282 |
| 2017/0331936 | A1* | 11/2017 | Juzswik | H04M 1/7253 |
| 2018/0098191 | A1* | 4/2018 | Srinivasan | H04W 4/021 |
| 2018/0229674 | A1* | 8/2018 | Heinrich | A61B 3/11 |
| 2018/0281560 | A1* | 10/2018 | Dearth | B60H 1/00742 |
| 2019/0013960 | A1* | 1/2019 | Sadwick | H05B 47/10 |
| 2019/0126934 | A1* | 5/2019 | Wellborn | H04W 4/44 |

FOREIGN PATENT DOCUMENTS

| | | |
|---|---|---|
| JP | 2002-259012 A | 9/2002 |
| JP | 2009-103328 A | 5/2009 |
| JP | 2016-070514 A | 5/2016 |
| JP | 2016-176650 A | 10/2016 |
| JP | 2017-146760 A | 8/2017 |

OTHER PUBLICATIONS

International Search Report dated Dec. 26, 2017 issued in the corresponding International Application No. PCT/JP2017/040882 (and English translation).

Office Action dated Feb. 9, 2021 issued in corresponding JP patent application No. 2019-554064 (and English machine translation).

Office Action dated Jun. 29, 2021, issued in corresponding JP Patent Application No. 2019-554064 (and English Machine Translation).

* cited by examiner

FIG. 6

CONTROL CONTENTS DETERMINATION INFORMATION

| IDENTIFICATION INFORMATION OF USER | IDENTIFICATION INFORMATION OF OPERATION | DENTIFICATION INFORMATION OF OPERATION ENVIRONMENT | CONTROL CONTENTS INFORMATION | |
|---|---|---|---|---|
| | | | CONTROL TYPE | CONTROL AMOUNT |
| USER A | COOL | SUMMER | COOL | −2°C |
| USER A | COOL | FALL | COOL | −1°C |
| USER A | HEAT | WINTER | HEAT | +4°C |
| USER A | START INSTRUCTION | SUMMER | COOL | −2°C |
| USER A | START INSTRUCTION | WINTER | HEAT | +4°C |
| USER B | COOL | SUMMER | COOL | −4°C |
| USER B | HEAT | WINTER | HEAT | +2°C |
| USER B | START INSTRUCTION | SUMMER | DEHUMIDIFY | −10% |
| ⋮ | ⋮ | ⋮ | ⋮ | ⋮ |

CONTROL SYSTEM, INSTALLATION EQUIPMENT, REMOTE CONTROLLER, CONTROL METHOD, AND PROGRAM

CROSS REFERENCE TO RELATED APPLICATION

This application is a U.S. national stage application of PCT/JP2017/040882 filed on Nov. 14, 2017, the contents of which are incorporated herein by reference.

TECHNICAL FIELD

The present disclosure relates to a control system, a facility device, a remote controller, a control method, and a program.

BACKGROUND ART

A control system that operates facility devices by a remote controller is conventionally known. In such a control system, the control contents at which a user feels comfortable typically varies between individuals. Therefore, in a case in which there are multiple users who operate a single remote controller, it may be necessary for a user who operates the remote controller to perform an operation to change the control contents each time the user changes in order to maintain comfort.

However, given that it is very troublesome to perform an operation to change the control contents each time the user changes, this style of operation is not exactly convenient. In order to address this, techniques are being developed to call control contents that are associated with a user operating the remote controller. For example, Patent Literature 1 discloses a technique for collecting air-conditioning environments that each user feels comfortable in and controls, at the start of operation, air conditioners in accordance with the air-conditioning environment associated with the user who gave the instruction to start the operation.

CITATION LIST

Patent Literature 1: Unexamined Japanese Patent Application Publication No. 2016-70514

SUMMARY OF INVENTION

Technical Problem

However, with the technique disclosed in Patent Literature 1, most of the processing is performed by an operation terminal. Examples of such processing include processing for collecting air conditioning environments, processing for identifying a user, and processing for identifying an air-conditioning environment based on the identified user. As such, with the technology disclosed in Patent Literature 1, it is necessary to provide the operation terminal with a storage having a large capacity and a high-performance processor and these are shortcomings in that cost reductions cannot be achieved. Therefore, there is a demand for a technique that achieves a control system that is both low in cost and very convenient.

In order to solve the aforementioned problems, an objective of the present disclosure is to provide a control system, a facility device, a remote controller, a control method, and a program that are low in cost and very convenient.

Solution to Problem

In order to achieve the aforementioned objective, a control system according to the present disclosure includes:
a facility device; and
a remote controller configured to remotely operate the facility device,
wherein
the remote controller comprises:
 operation accepting means for accepting, from a first user, a first operation with respect to the facility device;
 identification information acquisition means for acquiring identification information of the first user; and
 transmission means for transmitting the identification information of the first user and identification information of the first operation to the facility device,
and the facility device comprises:
 storage means for storing control contents determination information containing identification information of users who use the facility device, identification information of operations with respect to the facility device, and control contents with respect to the facility device, in association with one another;
 receiving means for receiving, from the remote controller, the identification information of the first user and the identification information of the first operation; and
 device control means for controlling, when the identification information of the first user and the identification information of the first operation are received by the receiving means, the facility device in accordance with control contents associated with the identification information of the first user and the identification information of the first operation by the control contents determination information.

Advantageous Effects of Invention

In the present disclosure, the remote controller receives a first operation from the first user, either the remote controller or the facility device acquires the identification information of the first user, and the facility device controls the facility device in accordance with control contents associated with the identification information of the first user and the identification information of the first operation by the control contents determination information. In doing so, the present disclosure can achieve a control system that is low in cost and high and very convenient.

BRIEF DESCRIPTION OF DRAWINGS

FIG. 6 is a diagram schematically illustrating control contents determination information;

DESCRIPTION OF EMBODIMENTS

Embodiment 1

First, a configuration of a control system 1000 according to Embodiment 1 of the present disclosure is described with reference to FIG. 1. The control system 1000 is a system that controls operations of a facility device 100 by remote operation using a remote controller 200. The control system 1000 includes a function for distinguishing between users (that is, operators) of the remote controller 200, a function for controlling the facility device 100 in accordance with the control contents associated with the user, and a function for updating control contents associated with the user in accordance with a history of operations performed by the user. In other words, with the control system 1000, it can be expected that the facility device 100 will be controlled in accordance with control contents varying from user to user, even in a case where a same operation is performed. Also, with the control system 1000, as the user performs operations, it can be expected that the control contents will become more tailored to the preferences of the user.

Figure 1:
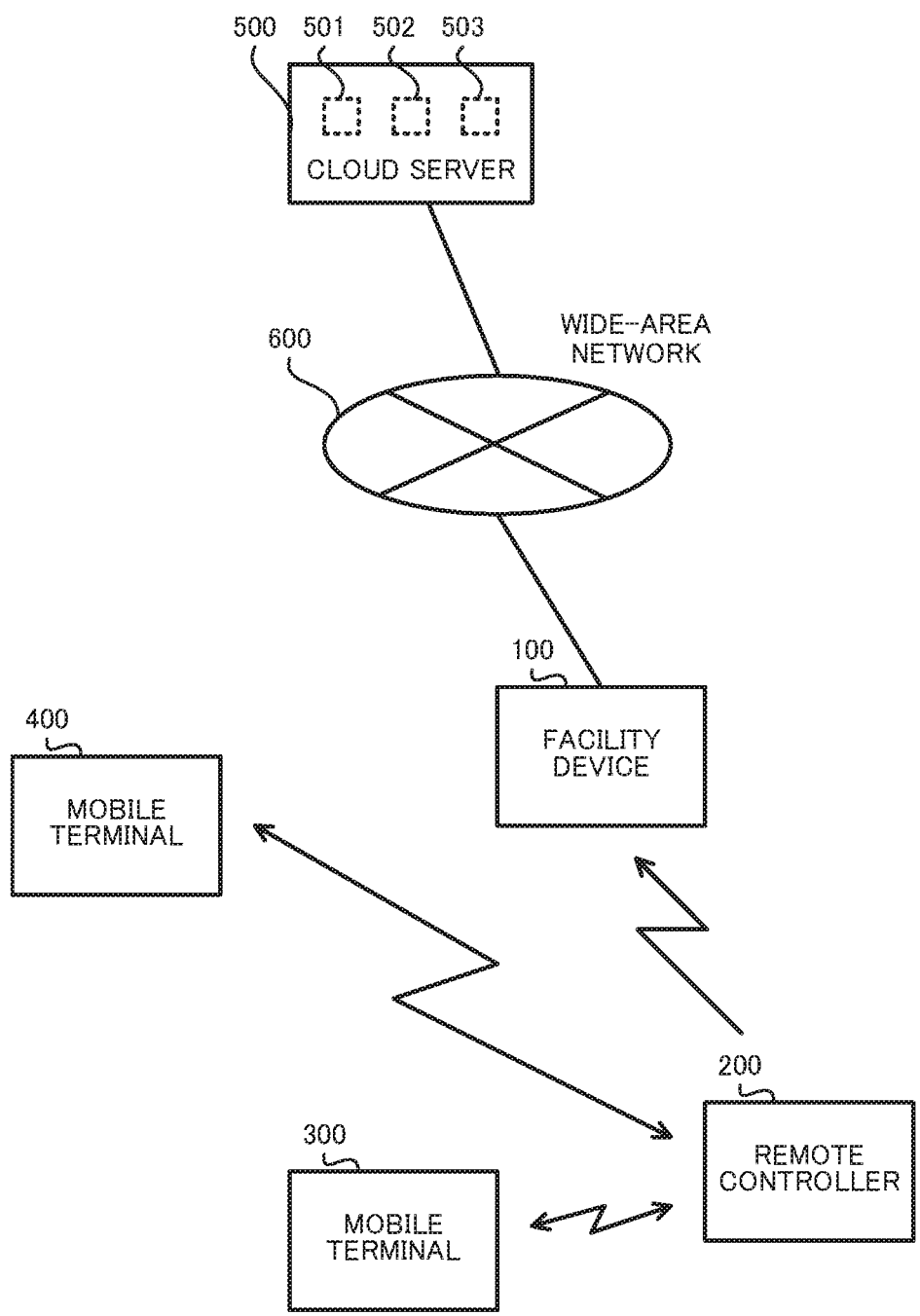
FIG. 1 is a configuration diagram of a control system according to Embodiment 1 of the present disclosure.

As illustrated in FIG. 1, the control system 1000 includes the facility device 100, the remote controller 200, a mobile terminal 300, a mobile terminal 400, and a cloud server 500. The facility device 100 and the cloud server 500 are connected to each other via a wide-area network 600. In the current embodiment, the control system 1000 is an air-conditioning control system that is provided in a dwelling. The facility device 100 is described as an air conditioner.

The facility device 100 is a device that is operated by remote operation using the remote controller 200. As described above, in the current embodiment, the facility device 100 is an air conditioner that adjusts the air inside the dwelling. The phrase "adjusts the air" refers to, for example, adjusting the temperature, adjusting the humidity, sending air to a space, or removing impurities in the air. The facility device 100 includes, for example, one outdoor unit (not-illustrated) and at least one indoor unit (not-illustrated). The facility device 100 includes a function for receiving data from the remote controller 200 and a function for communicating with the cloud server 500 via the wide-area network 600. Next, a configuration of the facility device 100 is described with reference to FIG. 2.

Figure 2:
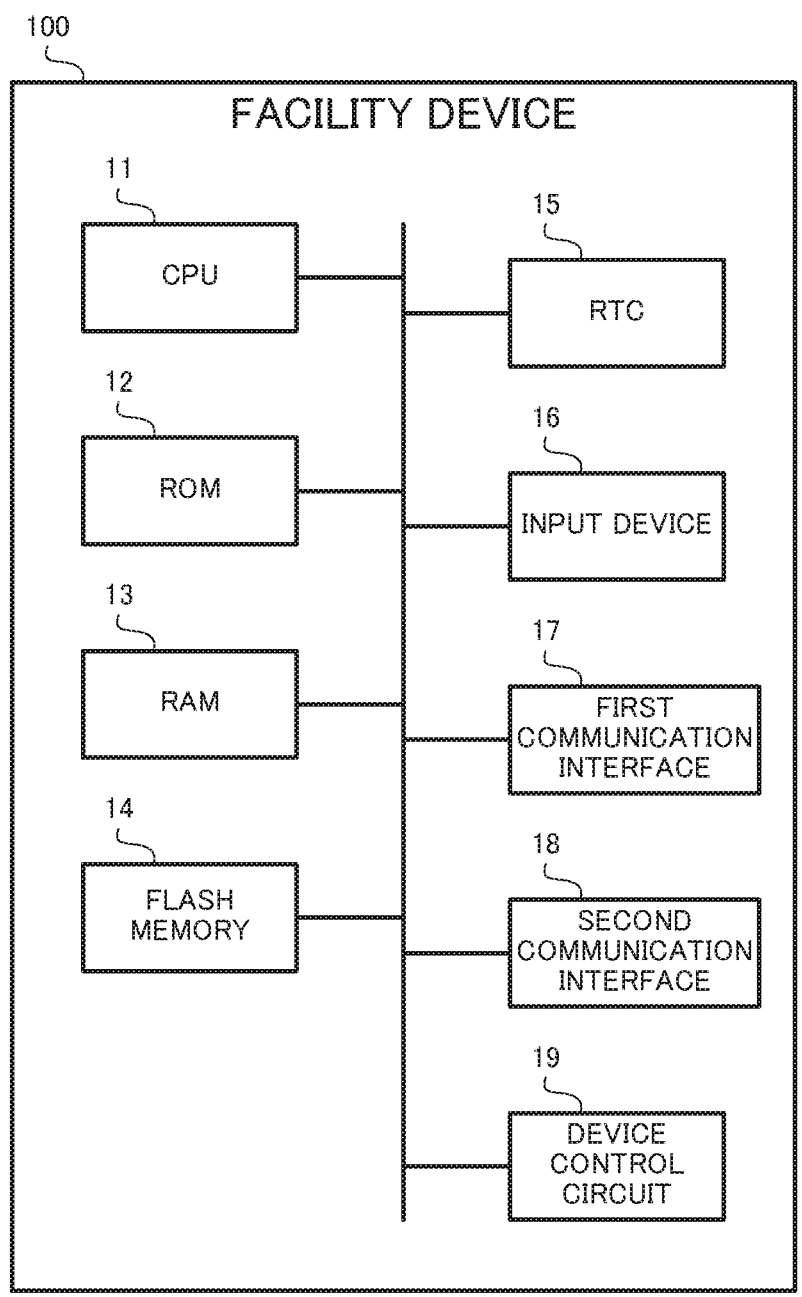
FIG. 2 is a configuration diagram of a facility device according to Embodiment 1 of the present disclosure.

As illustrated in FIG. 2, the facility device 100 includes a central processing unit (CPU) 11, a read-only memory (ROM) 12, a random access memory (RAM) 13, a flash memory 14, a real-time clock (RTC) 15, an input device 16, a first communication interface 17, a second communication interface 18, and a device control circuit 19. The components included in the facility device 100 are connected to one another via a bus.

The CPU 11 controls the overall operations of the facility device 100. The CPU 11 operates in accordance with a program stored in the ROM 12 and uses the RAM 13 as a working area. In the ROM 12, programs and data for controlling the overall operations of the facility device 100 area stored. The RAM 13 functions as the working area of the CPU 11. In other words, the CPU 11 temporarily writes programs and data onto the RAM 13 and refers to the written programs and data as necessary.

The flash memory 14 is a non-volatile memory for storage of various types of information. The RTC 15 is a device for time-keeping. The RTC 15 has, for example, a built-in battery and continues time-keeping even while the facility device 100 is turned off. The RTC 15 includes, for example, an oscillation circuit provided with a crystal oscillator. The input device 16 is a device that receives operations made by a user and, for example, includes buttons for receiving various types of operations. The input device 16 detects operations performed by the user and supplies to the CPU 11 a signal indicating a result of the detection. In this way, the input device 16 functions as a user interface of the facility device 100.

The first communication interface 17 is an interface for receiving data from the remote controller 200. The first communication interface 17 is, for example, an infrared communication interface that receives data transmitted from the remote controller 200 by infrared communication.

The second communication interface 18 is an interface for connecting the facility device 100 to the vide-area network 600. The wide-area network 600 enables the facility device 100 to communicate with various devices connected to the wide-area network 600. The second communication interface 18 is, for example, a local area network (LAN) such as a network interface card (NIC).

The device control circuit 19 is a circuit that controls operations of the facility device 100 by operation of a load device (not illustrated) in accordance with control by the CPU 11. The load device is, for example, an actuator used during air-conditioning control. Next, the configuration of the remote controller 200 is described with reference to FIG. 3.

Figure 3:
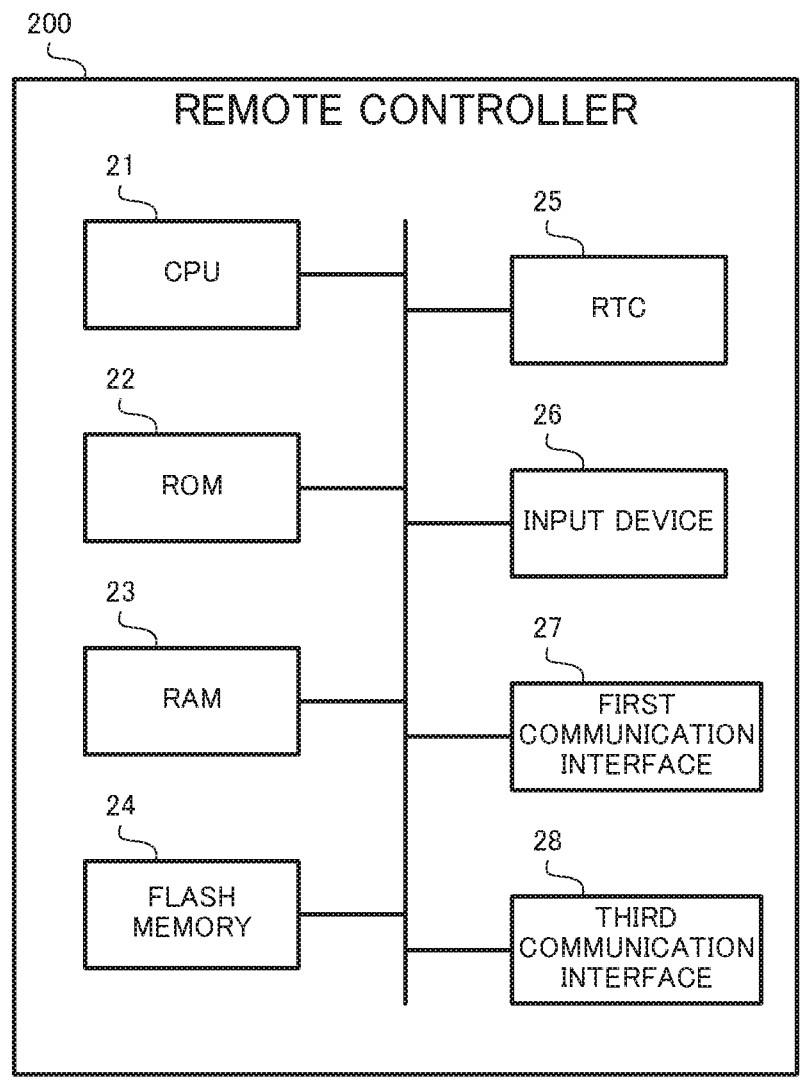
FIG. 3 is a configuration diagram of a remote controller according to Embodiment 1 of the present disclosure.

As illustrated in FIG. 3, the remote controller 200 includes a CPU 21, a ROM 22, a RAM 23, a flash memory 24, an RTC 25, an input device 26, a first communication interface 27, and a third communication interface 28. The components included in the remote controller 200 are connected to one another via a bus.

The CPU 21 controls the overall operations of the remote controller 200. Further, the CPU 21 operates in accordance with a program stored in the ROM 22 and uses the RAM 23 as a working area. In the ROM 22, programs and data for controlling the overall operations of the remote controller 200 area stored. The RAM 23 functions as the working area of the CPU 21. In other words, the CPU 21 temporarily writes programs and data onto the RAM 23 and refers to the written programs and data as necessary.

The flash memory 24 is a non-volatile memory for storage of various types of information. The RTC 25 is a device for time-keeping. The RTC 25 has, for example, a built-in battery and continues time-keeping even while the remote controller 200 is turned off. The RTC 15 includes, for example, an oscillation circuit provided with a crystal oscillator. The input device 26 is a device that receives operations made by a user and, for example, includes buttons for receiving the various types of operations. The input device 26 detects operations performed by the user and supplies to the CPU 21 a signal indicating a result of the detection. In this way, the input device 26 functions as a user interface of the remote controller 200.

The first communication interface 27 is an interface for transmitting data to the facility device 100. The first communication interface 27 includes an infrared communication interface for transmitting data by infrared communication to the facility device 100, for example.

The third communication interface 28 includes an interface for communicating with the mobile terminal 300 and the mobile terminal 400 by short-range wireless communication. The third communication interface 28, is, for example a wireless communication interface compatible with Bluetooth (registered trademark) such as Bluetooth (registered trademark) Low Energy (BLE) or compatible with near-field radio communication (NFC).

The mobile terminal 300 is a terminal that is carried by a user who operates the remote controller 200. The mobile terminal 300 has a function for transmitting identification information of the user who carries the mobile terminal 300 to the remote controller 200 by short-range wireless communication. The mobile terminal 300 includes a controller (not illustrated), a communicator (not illustrated), a storage (not illustrated), a display (not illustrated), an operation acceptor (not illustrated), and the like. The storage included in the mobile terminal 300 stores identification information of the user who carries the mobile terminal 300. The communicator included in the mobile terminal 300 transmits the identification information of the user stored in the storage to the remote controller 200. The mobile terminal 300 is, for example, a smartphone.

The mobile terminal 400 is a terminal that is carried by a user who operates the remote controller 200. The user who carries the mobile terminal 300 and the user who carries the mobile terminal 400 are different users. The mobile terminal 400 has a function for transmitting identification information of the user who carries the mobile terminal 400 to the remote controller 200 by short-range wireless communication. The configuration of the mobile terminal 400 is fundamentally similar to the configuration of the mobile terminal 300. The mobile terminal 400 is, for example, a smartphone.

In the current embodiment, although an example in which the mobile terminal 300 transmits identification information of the user who carries the mobile terminal 300 is provided, the mobile terminal 300 may instead merely transmit identification information of the mobile terminal 300. In such a case, it is sufficient as long as (i) association information containing the identification information of the mobile terminal 300 and the identification information of the user who carries the mobile terminal 300 in association with each other is stored in, for example, the cloud server 500 and (ii) the identification information of the user who carries the mobile terminal 300 can be easily identified based on the identification information of the mobile terminal 300.

In other words, the identification information of the user who carries the mobile terminal 300 and the identification information of the mobile terminal 300 can be handled as substantially the same. The user who carries the mobile terminal 300 is assumed to be the user who owns the mobile terminal 300. Similarly, the identification information of the user who carries the mobile terminal 400 and the identification information of the mobile terminal 400 can be handled as substantially the same. It is assumed that the user who carries the mobile terminal 400 is the user who owns the mobile terminal 400.

The cloud server 500 is a server that provides resources in cloud computing. The cloud server 500, for example, has a function for storing control contents determination information, a function for extracting information included in the control contents determination information, and a function for updating information included in the control contents determination information, all of which are described further below. The cloud server 500 also has a function for storing the aforementioned association information, a function for extracting information included in the association information, and a function for updating information included in the association information. Further, the cloud server 500 has a function for storing weather information indicating weather (air pressure, air temperature, humidity, wind direction, wind speed, cloud cover, precipitation amount, and the like) of the local area in which the facility device 100 is installed, and a function for providing the weather information to the facility device 100.

The cloud server 500 has a function for communicating with the facility device 100 via the wide-area network 600. The cloud server 500 includes a controller 501, a communicator 502, and a storage 503. The controller 501 includes a processor and controls the overall operations of the cloud server 500. The communicator 502 includes a communication interface and connects the cloud server 500 to the wide-area network 600. The storage 503 includes a hard disk and stores the control contents determination information, the association information, and the weather information. The wide-area network 600 has a function for connecting the facility device 100 and the cloud server 500 together. The wide-area network 600 is, for example, the Internet.

Figure 4:
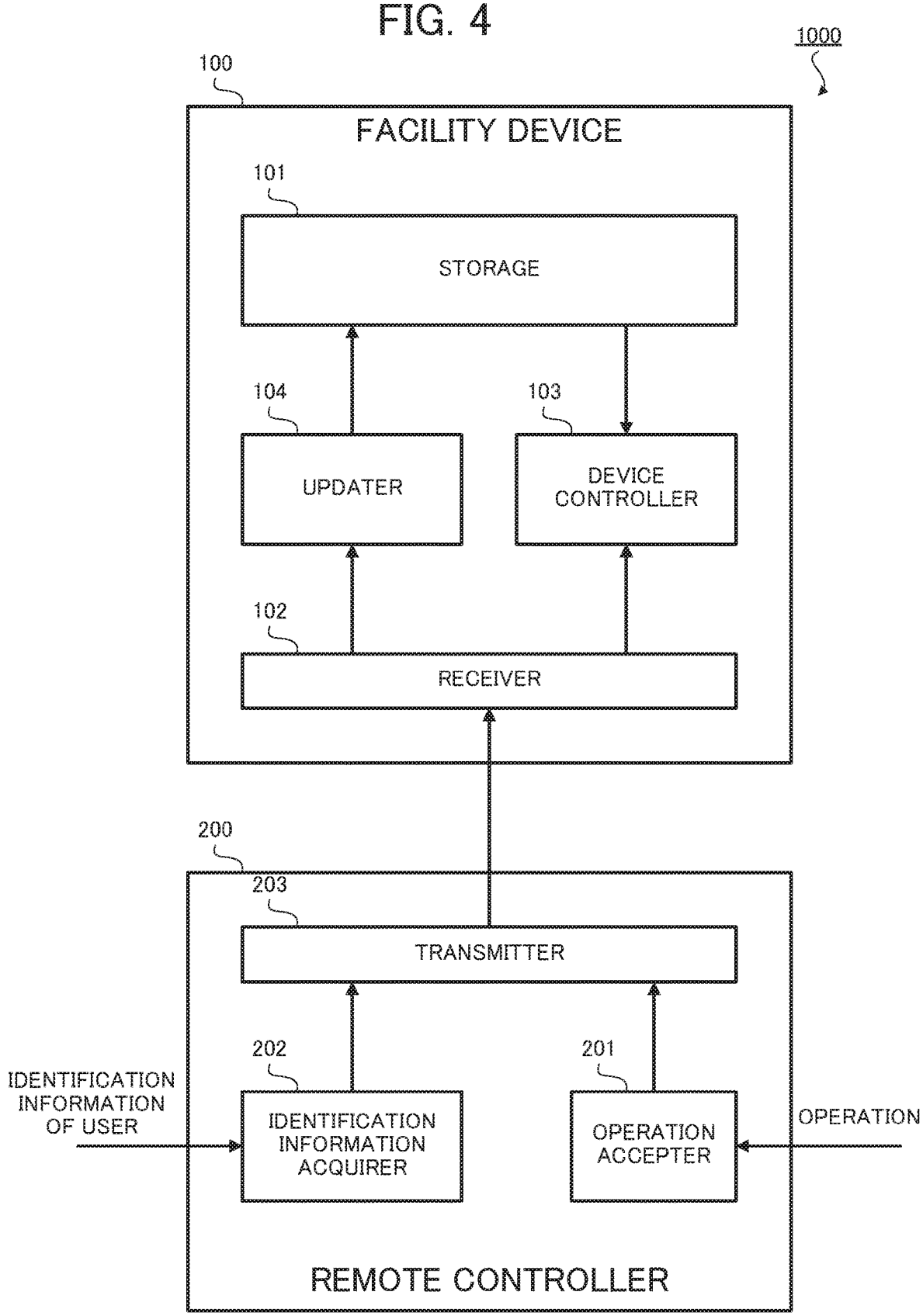
FIG. 4 is a functional configuration diagram of the control system according to Embodiment 1 of the present disclosure.

Next, the basic functions of the control system 1000 are described with reference to FIG. 4. The facility device 100 functionally includes a storage 101, a receiver 102, a device controller 103, and an updater 104. The remote controller 200 functionally includes an operation acceptor 201, an identification information acquirer 202, and a transmitter 203.

The operation acceptor 201 accepts, from the user, a first operation with respect to the facility device 100. The first operation is an operation among operations performed with respect to the facility device 100. The first operation is, for example, an operation to be observed and the last operation. A first user is a user among users who uses the facility device 100. The first user is, for example, a user to be observed and is the last person who operated the facility device 100. The functions of the operation acceptor 201 can be accomplished, for example, by the functions of the input device 26. The operation acceptor 201 corresponds to the operation accepting means.

The identification information acquirer 202 acquires identification information of the first user. The identification information of a user may be any information as long as the information enables identification of the user. The identification information of a user is, for example, a character string indicating a name of a user or is a number assigned to a user. The functions of the identification information acquirer 202 can be accomplished, for example, by cooperation between the CPU 21 and the third communication interface 28. The identification information acquirer 202 corresponds to the identification information acquisition means.

The transmitter 203 transmits identification information of the first user and identification information of the first operation to the facility device 100. The identification information of an operation can be any information as long as the information enables identification of an operation. The identification information of an operation is, for example, a character string indicating a name of an operation or is a number assigned to an operation. The functions of the transmitter 203 can be accomplished, for example, by cooperation between the CPU 21 and the first communication interface 27. The transmitter 203 corresponds to the transmission means.

The storage 101 stores control contents determination information containing identification information of a user who uses the facility device 100, identification information of an operation with respect to the facility device 100, and control contents with respect to the facility device 100, in association with one another. The control contents determination information is information for determining control contents based on identification information of the user and identification information of the operation. In other words, the control contents determination information is information that defines control contents by user and by operation. In the current embodiment, it is assumed that control contents determination information stored in the storage 101 that is included in the facility device 100 and the control contents determination information stored in the storage 503 that is included in the cloud server 500 are in synch with each other and updated. The functions of the storage 101 are accomplished by, for example, the functions of the flash memory 14. The storage 101 corresponds to the storage means.

The receiver 102 receives, from the remote controller 200, the identification information of the first user and identification information of the first operation. The functions of the receiver 102 are accomplished by, for example, the functions of the first communication interface 17. The receiver 102 corresponds to the receiving means.

In a case where the identification information of the first user and the identification information of the first operation are received by the receiver 102, the device controller 103 controls the facility device 100 in accordance with the control contents associated with the identification information of the first user and the identification information of the first operation by the control contents determination information. In other words, the device controller 103 (i) identifies, based on the control contents determination information defining control contents for each user and for each operation, control contents that are to be performed when the first user performs the first operation and (ii) controls the facility device 100 in accordance with the identified control contents. The functions of the device controller 103 are accomplished by cooperation between the CPU 11 and the device control circuit 19. The device controller 103 corresponds to the device control means.

Here, the identification information acquirer 202 preferably receives, from at least one mobile terminal (the mobile terminal 300 and the mobile terminal 400, for example) by short-range wireless communication, at least one user identification information (identification information of a user who owns the mobile terminal 300 and identification information of a user who owns the mobile terminal 400, for example). Further, the identification information acquirer 202 acquires the identification information of a user received at the greatest signal reception strength among the at least one identification information of a user. This information is acquired as the identification information of the first user. That is, the identification information acquirer 202 acquires the identification information of a user received from the nearest mobile terminal (the mobile terminal 300, for example) from the remote controller 200, as identification information of the first user.

In a case where the identification information of the first user and identification information of the first operation are received by the receiver 102, the updater 104 updates the control content associated with the identification information of the first user by the control contents determination information. That is, in a case where a first operation is performed by the first user, the updater 104 updates the control content regarding the first user among the control contents included in the control contents determination information. The functions of the updater 104 are accomplished by, for example, the CPU 11 executing the program stored in the ROM 12 or the flash memory 14.

Figure 5:
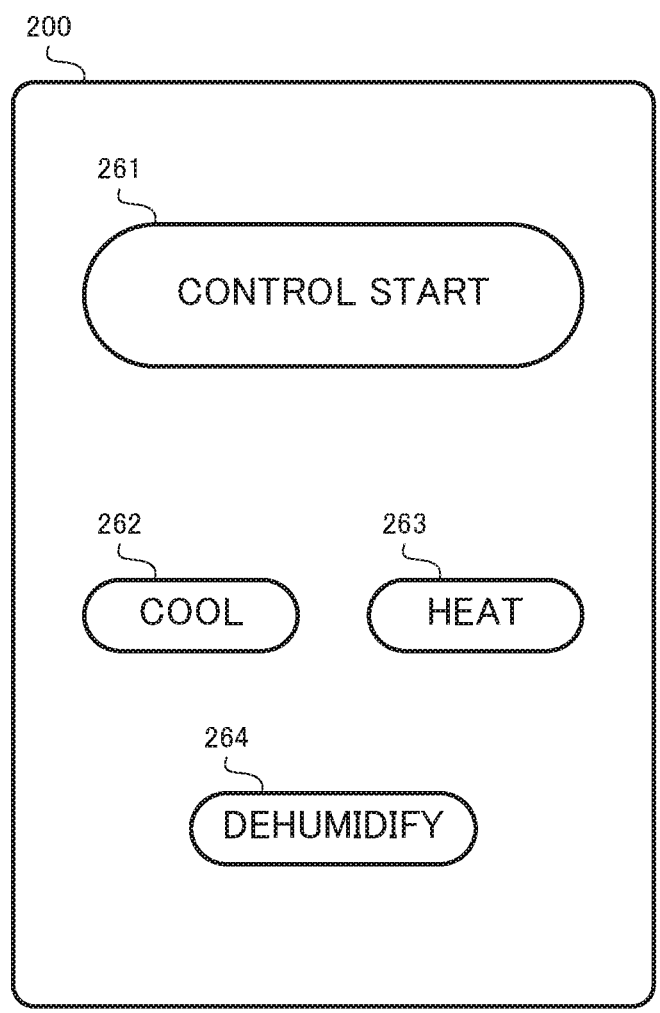
FIG. 5 is an external view of the remote controller according to Embodiment 1 of the present disclosure.

Next, the functions of the updater 104 are described with reference to FIG. 5 and FIG. 6. FIG. 5 is an external view of the remote controller 200. As illustrated in FIG. 5, the remote controller 200 includes a button 261, a button 262, a button 263, and a button 264.

The button 261 is a button for receiving a start instruction operation providing an instruction for starting control. The start instruction operation is an operation providing an instruction for starting control of one control type defined by the control contents determination information. The button 262 is a button for receiving a type-designation operation providing an instruction for cooling as the control type. The button 263 is a button for receiving a type-designation operation providing an instruction for heating as the control type. The button 264 is a button for receiving a type-designation operation providing an instruction for dehumidifying as the control type.

FIG. 6 is a diagram schematically illustrating control contents determination information. As illustrated in FIG. 6, the control contents determination information is information containing identification information of a user, identification information of an operation, identification information of an operation environment, and control contents information, in association with one another. The operation environment is a concept including at least one of seasons, time-of-day periods, or weather. In FIG. 6, an example is given in which the operation environment is defined by seasons designated as spring, summer, fall, and winter.

Here, operations with respect to the facility device 100 include a start instruction operation providing an instruction for starting control and a type-designation operation providing an instruction for designating a control type. The operation with respect to the button 261 is the start instruction operation. The operations with respect to the button 262, the button 263, and the button 264 are type-designation operations. Also, the control contents with respect to the facility device 100 include control type and control amount. The control type is cooling, heating, or dehumidifying. In the current embodiment, the control amount with respect to cooling is defined by a target decrease value in the temperature of a room, the control amount with respect to heating is defined by a target increase value in the temperature of a room, and the control amount with respect to dehumidifying is defined by a target decrease value in the humidity. However, how the control amount is to be defined may be adjusted as necessary.

Here, in a case where the first operation by the first user is performed continuously, the updater 104 can increase the control amount at the time when the first operation was performed by the first user. The updater 104 can make a determination that the first operation was performed continuously by first user when the identification information of the first user and the identification information of the first operation are received by the receiver 102 within a predetermined amount of time (a length of time of several seconds to some tens of minutes, for example) since the identification information of the first user and the identification information of the first operation were last received by the receiver 102. Further, the updater 104 increases the control amount included in the control contents that are associated with the identification information of the first user and the identification information of the first operation by the control contents determination information, and as a result, the control amount at the time when the first operation was performed by the first user can be increased.

For example, next, it is assumed that (i) user A is the first user, (ii) the operation providing the instruction for cooling is the first operation, and (iii) the season is summer. In such a case, when the user A pushes the button 262 providing the instruction for cooling, the device controller 103, as illustrated by the record entry on the first line in FIG. 6, controls the facility device 100 such that the cooling is performed using the control amount in which the temperature of the room is decreased by 2° C. Here, if user A presses the button 262 again before the aforementioned predetermined time elapses, the updater 104 increases the control amount in the record entry on the first line in FIG. 6 to −3° C. from −2° C. Subsequently, when user A presses the button 262, the device controller 103 controls the facility device 100 such that cooling is performed using the control amount in which the temperature of the room is decreased by approximately 3° C. In this way, in a case where the same operation is performed continuously, the updater 104 updates the control contents determination information such that the control amount increases when this operation is performed.

Also, in a case where the first operation and a second operation designating a control type contradictory to the control type designated by the first operation are performed continuously by the first user, the updater 104 can decrease the control amount at the time the first operation was performed by the first user. In a case where the identification information of the first user and identification information of the second identification information are received by the receiver 102 within a predetermined amount of time (a length of time of several seconds to some tens of minutes, for example) since the identification information of the first user and the identification information of the first operation are last received by the receiver 102, the updater 104 can make a determination that the first operation and the second operation were performed continuously by the first user. Further, the updater 104 decreases the control amount included in the control contents that are associated with the identification information of the first user and the identification information of the first operation by the control contents determination information, and as a result, the control amount at the time when the first operation was performed by the first user can be decreased.

For example, it is assumed that (i) the first user is user A. (ii) the operation providing the instruction for cooling is the first operation, (iii) the operation providing an instruction for heating is the second operation, and (iv) the season is summer. In such a case, when user A presses the button 262 providing the instruction for cooling, the device controller 103, as illustrated by the recording entry on the first line in FIG. 6, controls the facility device 100 such that the cooling is performed using the control amount in which the temperature of the room is decreased by 2° C. Here, if user A presses the button 263 providing the heating instruction before the aforementioned predetermined time elapses, the updater 104 reduces the control amount in the record entry on the first line in FIG. 6 to 1° C. from −2° C. Subsequently, when user A presses the button 262, the device controller 103 controls the facility device 100 such that cooling is performed using the control amount in which the temperature of the room is decreased by 1° C. In this way, in a case where operations providing instructions of contradictory controls are performed continuously, the updater 104 updates the control contents determination information such that the control amount at the time when the initial operation was performed decreases.

Also, in a case where the first operation that is a type-designation operation is performed by the first user in a first operation environment, the updater 104 can change the control type at the time when the start instruction was performed by the first user in the first operation environment to the control type designated by the first operation. In a case where the identification information of the first user and the identification information of the first operation that is the type-designation operation are received by the receiver 102 in the first operation environment, the updater 104 can make a determination that the first operation that is type-designation operation was performed by the first user in the first operation environment. Also, the updater 104 updates (i) the control type included in the control contents that are associated with the identification of the first user, the identification information of the start instruction operation, and the identification information of the first operation environment by the control contents determination information, (ii) to the control type designated by the first operation, and as a result, the control type at the time when the start instruction operation was performed by the first user in the first operation environment can be changed to the control type designated by the first operation.

For example, it is assumed that (i) the first user is user A, (ii) the operation providing the instruction for heating is the first operation, (iii) and the season is summer. In such a case, when user A presses the button 263 providing the instruction of heating, the device controller 103 controls the facility device 100 such that heating is performed. However, the updater 104 changes the control type in the record entry on fourth line in FIG. 6 from cooling to heating. Subsequently, in the summer, when the user A presses the button 261 providing an instruction for starting control, the device controller 103 controls the facility device 100 such that heating is performed. In this way, in the case where the start instruction operation is performed, the updater 104 updates the control contents determination information such that the control of the control type designated by the type-designation operation last performed by the same user in the same operation environment is executed.

Figure 7:
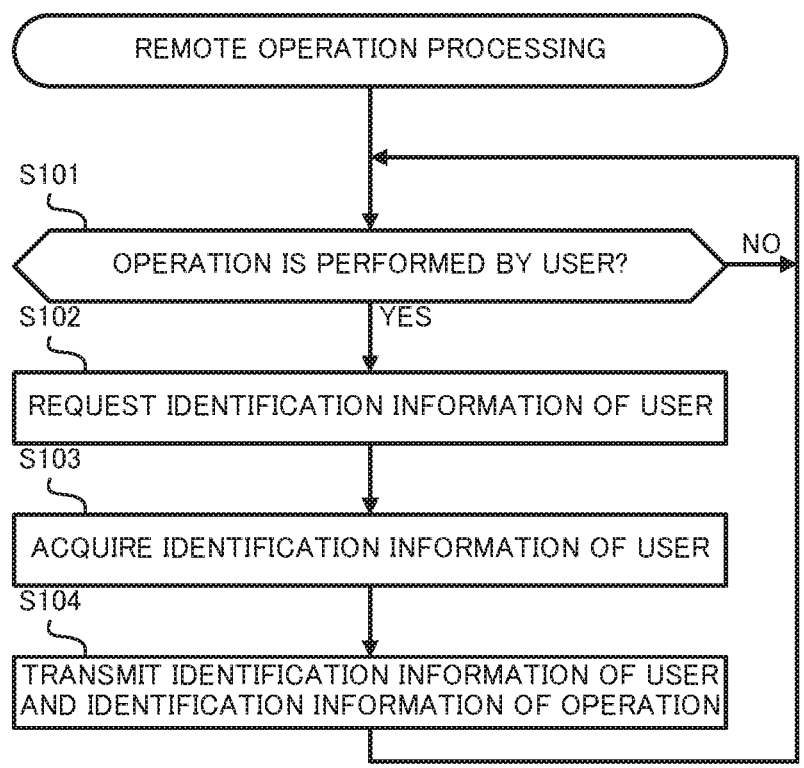
FIG. 7 is a flowchart illustrating remote operation processing that is executed by the remote controller according to Embodiment 1 of the present disclosure.

Next, the remote operation processing to be executed by the remote controller 200 is described with reference to the flowchart in FIG. 7. The remote operation processing is repeatedly executed while the power of the remote controller 200 is on, for example.

First, the CPU 21 makes a determination as to whether or not an operation is performed by a user (step S101). The CPU 21 makes a determination as to whether or not any button (the button 261, the button 262, the button 263, or the button 264) with which the input device 26 is equipped was pressed, for example. When the CPU 21 makes a determination that there is no operation performed by a user (NO in step S101), processing returns step S101. Conversely, if the CPU 21 makes a determination that a user operation was performed (YES in step S101), the CPU 21 requests for identification information of the user (step S102). Specifically, the CPU 21 controls the third communication interface 28 to transmit, by short-range wireless communication, radio waves indicating request information requesting for identification information of a user to be transmitted.

Upon completion of processing of step S102, the CPU 21 acquires the identification information of a user (step S103). Specifically, the CPU 21 acquires identification information of a user represented by the radio waves that the third communication interface 28 received by short-range wireless communication. In a case where the identification information of multiple users is acquired, the CPU 21 uses identification information of the user received at the greatest signal reception strength.

Upon completion of processing in step S103, the CPU 21 transmits identification information of the user and identification information of an operation (step S104). Specifically, the CPU 21 controls the first communication interface 27 to transmit the identification information of the user and the identification information of an operation to the facility device 100. When the CPU 21 completes processing of step S104, the CPU 21 returns processing to step S101.

Figure 8:
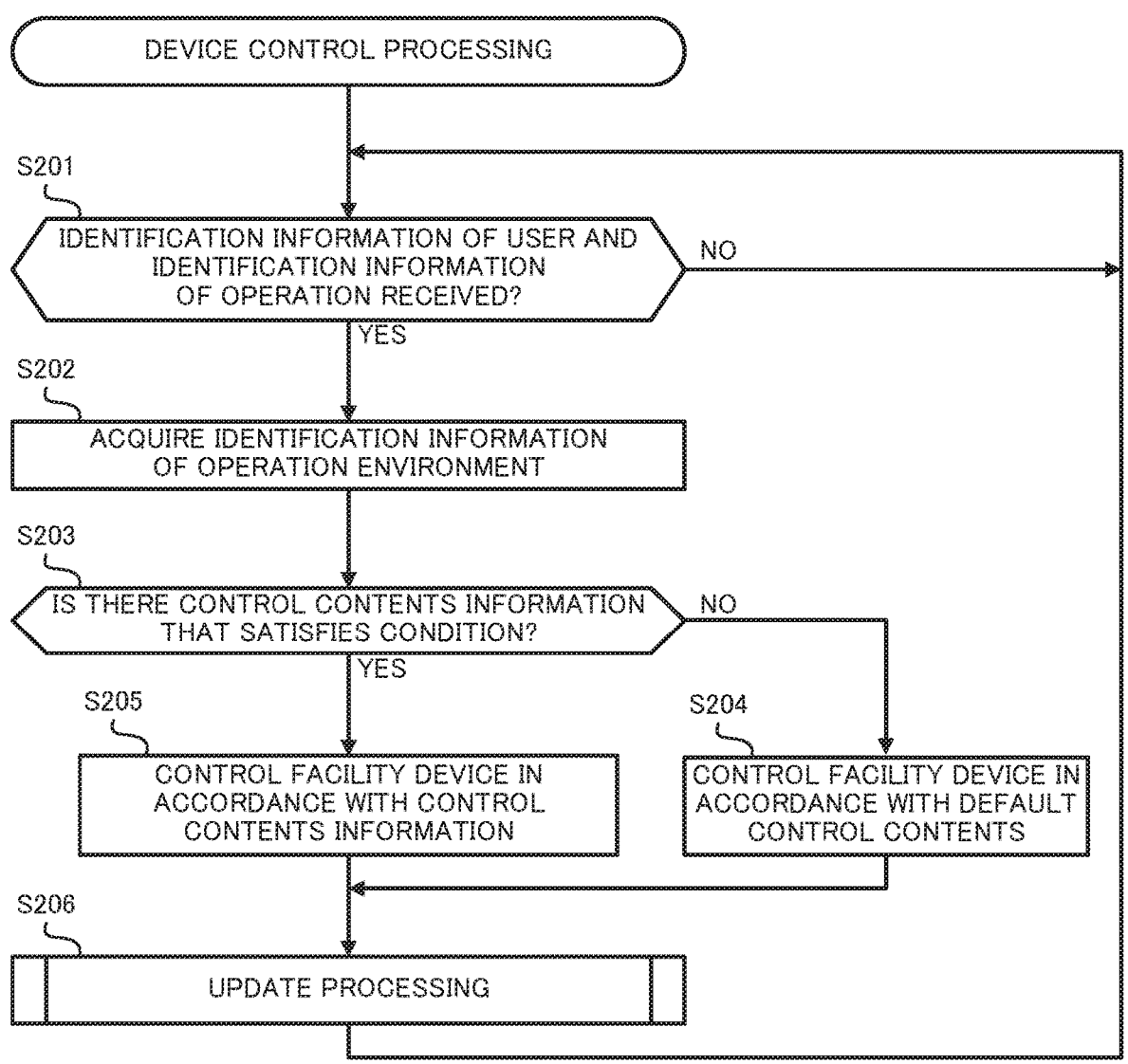
FIG. 8 is a flowchart illustrating device control processing that is executed by the facility device according to Embodiment 1 of the present disclosure.

Next, the device control processing to be executed by the facility device 100 is described with reference to the flowchart in FIG. 8. The device control processing is repeatedly executed while the power of the facility device 100 is on, for example.

First, the CPU 11 makes a determination as to whether or not the first communication interface 17 received identification information of a user and identification information of an operation (step S201). Specifically, the CPU 11 makes a determination as to whether or not the first communication interface 17 received the identification information of a user and the identification information of an operation from the remote controller 200. If the CPU 11 makes a determination that the identification information of a user and the identification information of an operation are not received (NO in step S201), the CPU 11 returns processing to step S201.

Conversely, if the CPU 11 makes a determination that identification information of a user and identification information of an operation are received (YES in step S201), the CPU 11 acquires identification information of the operation environment (step S202). For example, the CPU 11 can identify the season and time-of-day period based on time information provided by the RTC 15. The CPU 11 can also identify the weather by acquiring weather information from the cloud server 500 via the second communication interface 18. In this way, the CPU 11 acquires identification information enabling identification of the operation environment including at least one of seasons, times of day, or weather.

When the processing of step S202 is completed, the CPU 11 makes a determination as to whether or not there is control contents information that satisfies a condition (step S203). In other words, the CPU 11 makes a determination as to whether or not the control contents information associated with the received identification information of the user, the received identification information of the operation, and the acquired identification information of the operation environment by the control contents determination information. For example, in a case where a user who is yet to perform a type-designation operation performs a start instruction operation, the CPU 11 makes a determination that there is no control contents information that satisfies the condition.

Figure 9:
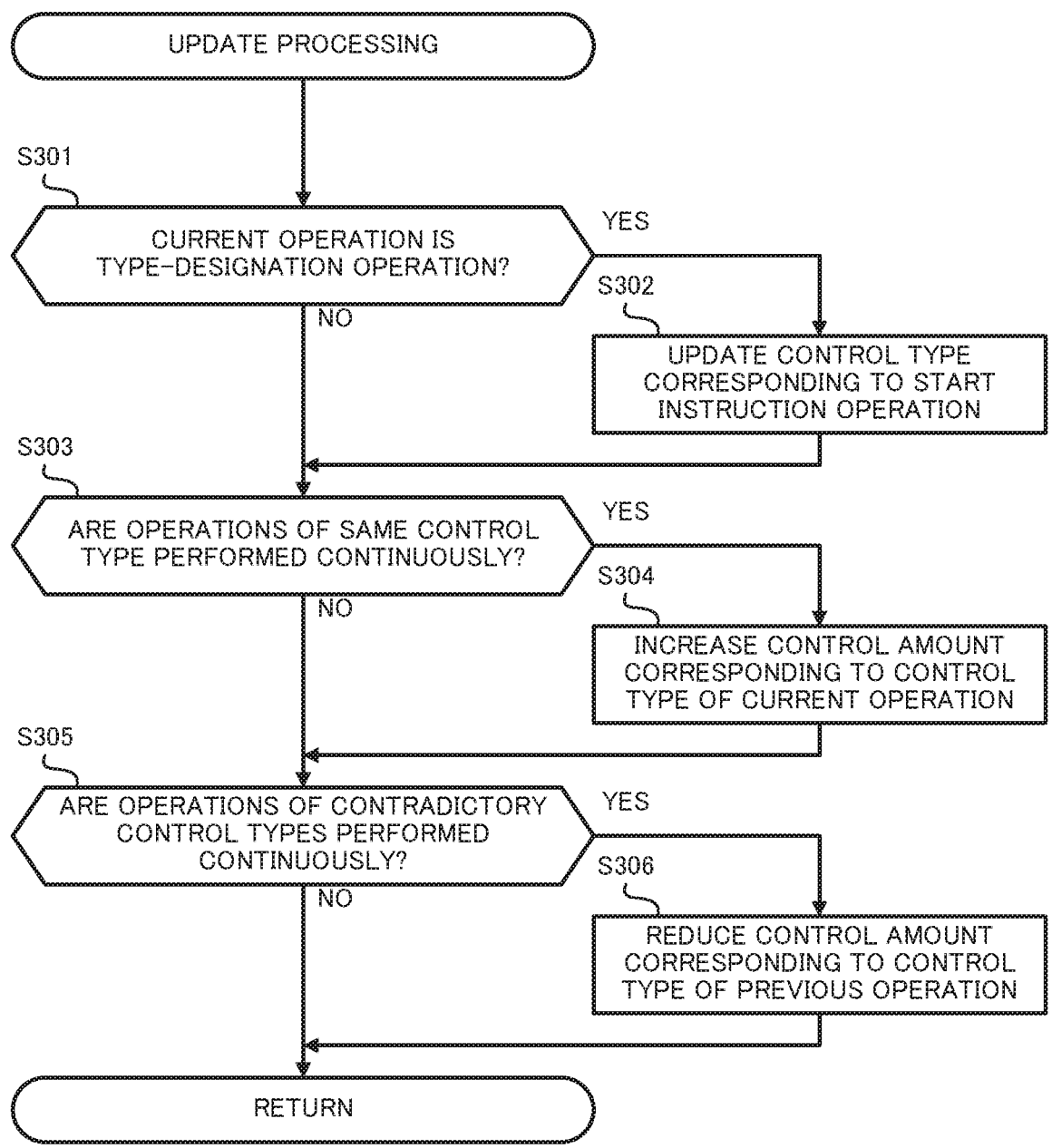
FIG. 9 is a flowchart illustrating update processing illustrated in FIG. 8.

If the CPU 11 makes a determination that there is no control contents information that satisfies the condition (NO in step S203), the CPU 11 controls the facility device 100 in accordance with the default control contents (step S204). Conversely, if the CPU 11 makes a determination that there is control contents information that satisfies the condition (YES in step S203), the CPU 11 controls the facility device 100 in accordance with the control contents information (step S205). When the processing of step S204 or step S205 is completed, the CPU 11 executes the update processing (step S206). The update processing is described in detail with reference to the flowchart in FIG. 9.

First, the CPU 11 makes a determination as to whether or not the current operation is a type-designation operation (step S301). If the CPU 11 makes a determination that the current operation is a type-designation operation (YES in step S301), the CPU 11 updates the control type corresponding to the start instruction operation (step S302). Specifically, the CPU 11 updates the control contents determination information such that the control type corresponding to the start instruction operation is the control type designated by the currently-performed type-designation operation.

If the CPU 11 makes a determination that the current operation is not a type-designation operation (NO in step S301), or if the processing of step S302 is completed, the CPU 11 makes a determination as to whether or not operations of the same control type are performed continuously (step S303). If the CPU 11 makes a determination that operations of the same control type are performed continuously (YES in step S303), the CPU 11 increases the control amount corresponding to the control type of the current operation (step S304). In other words, the CPU 11 updates the control contents determination information such that the control amount corresponding to the control type of the current operation increases.

If the CPU 11 makes a determination that operations of the same control type are not performed continuously (NO in step S303), or if the processing of step S304 is completed, the CPU 11 makes a determination as to whether or not operations of contradictory control types are performed continuously (step S305). If the CPU 11 makes a determination that operations of contradictory control types are performed continuously (YES in step S305), the CPU 11 reduces the control amount corresponding to the control type of the previous operation (step S306). In other words, the CPU 11 updates the control contents determination information such that the control amount corresponding to the control type of the previous operation is reduced.

If the processing of step S306 is completed or the CPU 11 makes a determination that operations of contradictory control types are not performed continuously (NO in step S305), the CPU 11 ends the update processing. When the update processing in step S206 is completed, the CPU 11 returns processing to step S201.

In the current embodiment, the remote controller 200 receives the first operation from the first user, the remote controller 200 acquires the identification information of the first user, and the facility device 100 controls facility device 100 in accordance with the control contents that are associated with the identification information of the first user and the identification information of the first operation by the control contents determination information. In other words, in the current embodiment, the facility device 100 can be controlled in accordance with suitable control contents corresponding to the user and operation while keeping the frequency at which the remote controller 200 performs such processing to a minimum. Therefore, in the current embodiment, the remote controller 200 does not need to be provided with a high-performance processor or an overabundance of memory, and thus the remote controller 200 can be provided with low cost. Therefore, the current embodiment achieves the control system 1000 that is both low in cost and very convenient.

Also, in the current embodiment, the remote controller 200 receives identification information of users by short-range wireless communication. The identification of a user received at the greatest signal reception strength is acquired as the identification information of the user who operated the remote controller 200. Therefore, with the current embodiment, identification information of the user can be suitably acquired without providing the remote controller 200 with any special components. In particular, as long as the mobile terminal 300 has the function to transmit the identification information of the user who carries the mobile terminal 300 or the identification information of the mobile terminal 300 by short-range wireless communication, it is sufficient to merely provide the remote controller 200 with a function that enables short-range wireless communication.

Also, in the current embodiment, when an operation is performed by a user, a piece of the control contents included in the control contents determination information is updated. Therefore, with the current embodiment, each time an operation is performed by the user, it can be expected that control contents will be updated with control contents more tailored to the user and operation.

Also, in the current embodiment, when operations designating the same control type are performed continuously, the control amount at the time when an operation designating the same control type is performed gets increased. Therefore, with the current embodiment, it can be expected that control details tailored to the user and operation can be achieved by a single operation.

Also, in the current embodiment, when operations designating control types different from each other are performed continuously, the control amount at the time when an operation was performed that is the same as the last operation gets decreased. Therefore, with the current embodiment, it can be expected that control details tailored to the user and operation can be achieved by a single operation.

Also, in the current embodiment, when the start instruction operation is performed, control of a control type designated by the last type-designation operation is executed in a similar condition. Therefore, with the current embodiment, it can be expected that control details tailored to the user can be achieved by a single operation.

Embodiment 2

In Embodiment 1, an example in which the remote controller 200 acquires identification information of a user is described. In the current embodiment, an example in which the facility device 100 acquires the identification information of the user is described.

Figure 10:
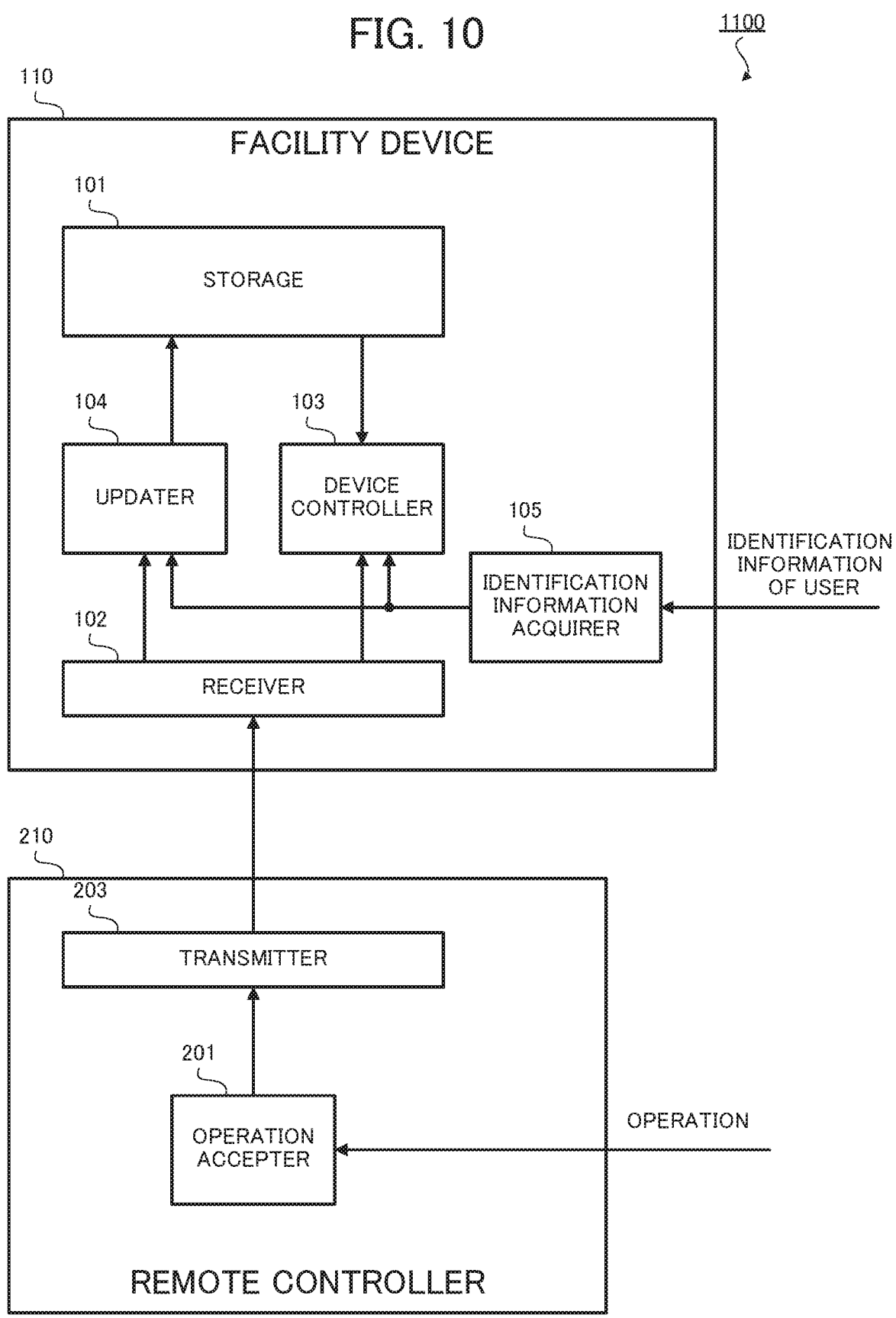
FIG. 10 is a functional configuration diagram of a control system according to Embodiment 2 of the present disclosure.

The basic functions of a control system 1100 according to the current embodiment are described with reference to FIG. 10. The control system 1100 includes a facility device 110 and a remote controller 210. Functionally, the only difference between the facility device 110 and the facility device 100 is that the facility device 100 includes an identification information acquirer 105. Functionally, the only difference between the remote controller 210 and the remote controller 200 is that includes an identification information acquirer 202.

The identification information acquirer 105 acquires identification information of the first user. The functions of the identification information acquirer 105 are accomplished by cooperation between the CPU 11 and a communication interface (not illustrated) having a similar configuration to that of the third communication interface 28 included in the facility device 100. The identification information acquirer 105 corresponds to the identification information acquisition means.

In the current embodiment, the updater 104 and the device controller 103 acquire identification information of a user from the identification information acquirer 105 instead of from the receiver 102.

In the current embodiment, the facility device 100 acquires identification information of a user. Therefore, the current embodiment enables the remote controller 210 to be provided at an even lower cost and achieves the control system 1000 that is even lower in cost and more convenient.

Modified Example

Although embodiments of the present disclosure are described above, modifications and applications based on various aspects can be used in implementing the present disclosure.

In the present disclosure, any parts of the configurations, functions, and operations described in the above embodiments may optionally be used. Moreover, in the present disclosure, besides the above-described configurations, functions, and operations, additional configurations, functions, and operations may be used. Moreover, the configurations, functions, and operations described in the above embodiments can be freely combined.

For example, in Embodiment 1, an example is described in which the facility device 100 is provided with the storage 101 that stores control contents determination information and the updater 104 that updates the control contents determination information. Alternatively, the cloud server 500 may be provided with the storage 101 and the updater 104. In such a case, it is sufficient as long as the aforementioned device control processing is performed by cooperation between the facility device 100 and the cloud server 500.

Also, in Embodiment 1, an example is described in which the control contents determination information includes identification information of an operation environment. The control contents determination information may be provided without any identification information of an operation environment included therein. Also, in Embodiment 1, an example is described in which the operation environment includes only seasons. The operation environment does not necessarily include seasons. The operation environment may also include time-of-day periods or weather. For example, in a case where the operation environment includes seasons, time-of-day periods, and weather, the control contents may be set such that they differ by season, time of day period, and weather while keeping the user and control the same.

In Embodiment 1, an example is described in which identification of a user is acquired by short-range wireless communication. Nevertheless, the method for acquiring the identification information of a user is not limited to this example. Examples include biometric authentication such as fingerprint authentication, authentication with use of a strain sensor that detects a grasping position and a grabbing strength of the remote controller 200, voice recognition with use of a microphone for collecting utterances of a user, and image recognition with use of an image-capturing device that captures an image of a user.

In Embodiment 1, an example is described in which the remote controller 200 is provided with an input device 26 that is equipped with multiple buttons. The remote controller 200 may be provided with a touchscreen instead of the input device 26. Likewise, the facility device 100 may be provided with a touchscreen instead of the input device 16.

In Embodiment 1, an example is described in which the facility device 100 and the remote controller 200 communicate by infrared communication. The facility device 100 and the remote controller 200 may communicate by another form of wireless communication that is not infrared communication or may communication by wired communication.

In Embodiment 1, an example is described in which the remote controller 200 is provided as a dedicated component with respect to the facility device 100. The remote controller 200 may be a smartphone or may be included as an application that runs on an operating system of the smartphone. Also, in Embodiment 1, an example is described in which the remote controller 200 is used by multiple users. The remote controller 200 may be provided on a per-user basis.

In Embodiment 1, an example is described in which the control system 1000 is a control system installed in a dwelling. The control system 1000 may be a control system installed in a building. Also, the control system 1000b does not need to be an air-conditioning system.

The control system 1000 may be a system for controlling a compartment temperature of a refrigerator on a per-user basis, a system for controlling the hardness to which rice is cooked or the rice-cooking end time on a per-user basis with use of a rice cooker, a system for controlling the cooking doneness or selection of often-used menus on a per-user basis with use of an induction heating cooking heater (IHCH), a system for controlling the humidity on a per-user basis with use of a dehumidifier, a system for controlling a blowing amount or an operation mode (normal, sleep, pollen removal) in an air purifier on a per-user basis, a system for controlling the intensity of illumination of an illumination device on a per-user basis, or a system for controlling a device operation, a device setting, or a device-linked operation on a per-user basis with use of a home energy management system (HEMS).

By an existing personal computer or an information terminal using an operational program specifying operation of the facility device 100 or the remote controller 200 according to the present disclosure, the personal computer or the like can be made to function as the facility device 100 or the remote controller 200 according to the present disclosure. Further, any method may be used for distribution of such a program, and for example, the program may be stored in a computer-readable recording medium such as a compact disc read-only memory (CD-ROM), digital versatile disc (DVD), a memory card, or the like, and then the computer-readable recording medium storing the program may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to control systems for controlling facility devices by a remote controller.

REFERENCE SIGNS LIST 11, 21 CPU
12, 22 ROM
13, 23 RAM
14, 24 Flash memory
15, 25 RTC
16, 26 Input device
17, 27 First communication interface
18 Second communication interface
19 Device control circuit
28 Third communication interface
100, 110 Facility device
101.503 Storage
102 Receiver
103 Device controller
104 Updater
105, 202 Identification information acquirer
200, 210 Remote controller
201 Operation acceptor
203 Transmitter
261, 262, 263, 264 Button
300, 400 Mobile terminal
500 Cloud server
501 Controller
502 Communicator
600 Wide-area network
1000, 1100 Control system

The invention claimed is:

1. A control system comprising:
a facility device; and
a remote controller configured to remotely operate the facility device, wherein
the remote controller comprises:
an operation accepter configured to accept, from a first user, a first operation with respect to the facility device;
an identification information acquirer configured to acquire identification information of the first user; and
a transmitter configured to transmit the identification information of the first user and identification information of the first operation to the facility device,
the facility device comprises:
a storage configured to store control contents determination information containing identification information of users who use the facility device, identification information of operations with respect to the facility device, and control contents with respect to the facility device, in association with one another;
a receiver configured to receive, from the remote controller, the identification information of the first user and the identification information of the first operation; and
a device controller configured to control, when the identification information of the first user and the identification information of the first operation are received by the receiver, the facility device in accordance with control contents associated with the identification information of the first user and the identification information of the first operation by the control contents determination information, and
the identification information acquirer receives user identification information by short range wireless communication, wherein the user identification information includes the identification information of the first user acquired from a mobile terminal of the first user, and other identification information acquired from a plurality of user mobile terminals respectively, and acquires the identification information of the first user to be transmitted with the identification information of the first operation to the facility device when a reception strength of the mobile terminal of the first user corresponds to a greatest signal reception strength among the received user identification information.

2. The control system according to claim 1, wherein the facility device further comprises an updater configured to update, when the identification information of the first user and the identification information of the first operation are received by the receiver, control contents associated with identification information of the first user by the control contents determination information.

3. The control system according to claim 2, wherein
the operations with respect to the facility device include a type-designation operation designating a control type,
the control contents with respect to the facility device include the control type and a control amount, and
the updater increases, when identification information of the first user and identification information of the first operation are received by the receiver within a predetermined amount of time since identification information of the first user and identification information of the first operation were received by the receiver, a control amount included in the control contents associated with the identification information of the first user and identification information of the first operation by the control contents determination information.

4. The control system according to claim 2, wherein
the operations with respect to the facility device include a type-designation operation designating a control type,
the control contents with respect to the facility device include the control type and a control amount, and
the updater decreases, when identification information of the first user and identification information of a second operation designating a control type contradictory to a control type designated by the first operation are received by the receiver within a predetermined amount of time since identification information of the first user and identification information of the first operation were received by the receiver, a control amount included in the control contents associated with the identification information of the first user and identification information of the first operation by the control contents determination information.

5. The control system according to claim 2, wherein
the operations with respect to the facility device include a start instruction operation providing an instruction for starting control and a type-designation operation providing an instruction for designating a control type,
the control contents with respect to the facility device include the control type,
the control contents determination information is information in which identification information of a user who uses the facility device, identification information of an operation with respect to the facility device, identification information of an operation environment including at least one of a season, a time-of-day period, or weather, and control contents with respect to the facility device, are in association with one another, and
the updater updates, when identification information of the first user and identification information of the first operation that is the type-designation operation are received by the receiver in a first operation environment, the control type included in control contents that are associated with the identification information of the first user, the identification information of the start instruction operation, and the identification information of the first operation environment, by the control contents determination information, to a control type designated by the first operation.

6. A facility device to be operated remotely by a remote controller, the facility device comprising:
a storage configured to store control contents determination information containing identification information of users who use the facility device, identification information of operations with respect to the facility device, and control contents with respect to the facility device, in association with one another;
a receiver configured to receive, from the remote controller, identification information of a first operation performed on the remote controller by a first user;
an identification information acquirer configured to acquire identification information of the first user;
a device controller configured to control, when the identification information of the first operation is received by the receiver and the identification information of the first user is acquired by the identification information acquirer, the facility device in accordance with control contents associated with the identification information of the first user and the identification information of the first operation by the control contents determination information; and
an updater configured to update, when the identification information of the first user and the identification information of the first operation are received by the receiver, control contents associated with identification information of the first user by the control contents determination information,
wherein
the operations with respect to the facility device include a type-designation operation designating a control type,
the control contents with respect to the facility device include the control type and a control amount, and
the updater increases, when identification information of the first user and identification information of the first operation are received by the receiver within a predetermined amount of time since identification information of the first user and identification information of the first operation were received by the receiver, a control amount included in the control contents associated with the identification information of the first user and identification information of the first operation by the control contents determination information.

7. A control method to be executed by a control system that includes a facility device and a remote controller configured to remotely operate the facility device, the control method comprising:
accepting, by the remote controller, from a first user, a first operation with respect to the facility device;
acquiring, by the remote controller or the facility device, identification information of the first user;
controlling, by the facility device, the facility device in accordance with control contents associated with identification information of the first user and identification information of the first operation contained in control contents determination information, wherein the control contents determination information contains identification information of users who use the facility device, identification information of operations with respect to the facility device, and control contents with respect to the facility device, in association with one another; and
receiving, by the remote controller, user identification information by short range wireless communication, wherein the user identification information includes the identification information of the first user acquired from a mobile terminal of the first user, and other identification information acquired from a plurality of user mobile terminals respectively, and acquiring the identification information of the first user to be transmitted with the identification information of the first operation to the facility device when a reception strength of the mobile terminal of the first user corresponds to a greatest signal reception strength among the received user identification information.

8. A non-transitory computer-readable recording medium having stored therein a program for a computer included in a facility device configured to be operated remotely by a remote controller and including:

a storage configured to store control contents determination information containing identification information of users who use the facility device, identification information of operations with respect to the facility device, and control contents with respect to the facility device, in association with one another; and a receiver configured to receive, from the remote controller, identification information of a first user who operated the remote controller and identification information of a first operation performed on the remote controller, the program to cause the computer to function as:

a device controller configured to control, when the identification information of the first user and the identification information of the first operation are received by the receiver, the facility device in accordance with control contents associated with the identification information of the first user and the identification information of the first operation by the control contents determination information; and an updater configured to update, when the identification information of the first user and the identification information of the first operation are received by the receiver, control contents associated with identification information of the first user by the control contents determination information, wherein the operations with respect to the facility device include a type-designation operation designating a control type, the control contents with respect to the facility device include the control type and a control amount, and the updater increases, when identification information of the first user and identification information of the first operation are received by the receiver within a predetermined amount of time since identification information of the first user and identification information of the first operation were received by the receiver, a control amount included in the control contents associated with the identification information of the first user and identification information of the first operation by the control contents determination information.

\* \* \* \* \*